United States Patent [19]

McLandrich

[11] Patent Number: 4,557,553
[45] Date of Patent: Dec. 10, 1985

[54] METHOD OF WAVELENGTH MULTIPLEXING IN FUSED SINGLE-MODE FIBER COUPLERS

[75] Inventor: Matthew N. McLandrich, San Diego, Calif.

[73] Assignee: The United States of America as represented by the Secretary of the Navy, Washington, D.C.

[21] Appl. No.: 317,662

[22] Filed: Nov. 2, 1981

[51] Int. Cl.$^4$ .............................................. G02B 5/14
[52] U.S. Cl. ............................ 350/96.15; 350/96.16; 370/1
[58] Field of Search ...................... 370/1, 3; 350/96.15, 350/96.19, 96.20, 96.21, 96.31, 96.16

[56] References Cited

U.S. PATENT DOCUMENTS

| | | | |
|---|---|---|---|
| 3,902,786 | 9/1975 | Brown | 350/96.16 |
| 4,112,293 | 9/1978 | Kach | 350/96.16 |
| 4,149,770 | 4/1979 | Milton et al. | 350/96.15 |
| 4,161,650 | 7/1979 | Caouette et al. | 307/DIG. 1 |
| 4,161,651 | 7/1979 | Sano et al. | 324/96 |
| 4,232,385 | 11/1980 | Hara et al. | 350/96.15 |
| 4,234,969 | 11/1980 | Singh | 350/96.16 |
| 4,243,297 | 1/1981 | Elion | 350/96.15 |
| 4,300,811 | 11/1981 | Ettenberg et al. | 350/1.1 |
| 4,301,543 | 11/1981 | Palmer | 350/96.15 |
| 4,315,666 | 2/1982 | Hicks, Jr. | 350/96.15 |
| 4,335,933 | 6/1982 | Palmer | 350/96.19 |
| 4,342,499 | 8/1982 | Hicks, Jr. | 350/96.15 |
| 4,343,532 | 8/1982 | Palmer | 350/96.19 |
| 4,362,359 | 12/1982 | Dammann et al. | 350/96.19 |

FOREIGN PATENT DOCUMENTS

55-76308  6/1980  Japan .................... 350/96.15

OTHER PUBLICATIONS

Schiffner et al., Applied Physics, vol. 23, No. 1, Sep. 1980, "Double-Core Single-Mode Optical Fiber as Directional Coupler," pp. 41-45.
Kapany and Burke, Optical Waveguides, Academic Press, N.Y. and London, 1972, pp. 233-257.

*Primary Examiner*—William L. Sikes
*Assistant Examiner*—Frank González
*Attorney, Agent, or Firm*—Robert F. Beers; Ervin F. Johnston; Thomas Glenn Keough

[57] ABSTRACT

An apparatus and method of entering and extracting a discrete wavelength of optical data in a single-mode duplex optical data transmission system relies on a selective evanescent field coupling. A continuous single-mode fiber transmits the two wavelengths in opposite directions with respect to each other. A length of a like single-mode fiber is fused to the continuous single-mode fiber such that the product of the fused length and the coupling coefficient of the fiber pairs equals $\pi/2$ at one of the optical frequencies to effect one-hundred percent evanescent field coupling to and from the continuous fiber. The product of the coupling coefficient and the fused length equals $\pi$ at the other optical wavelength to effect a zero percent evanescent field coupling. The other wavelength travels the length of the continuous single-mode fiber uninterrupted while the first wavelength is selectively coupled and decoupled from the fiber as desired.

2 Claims, 4 Drawing Figures

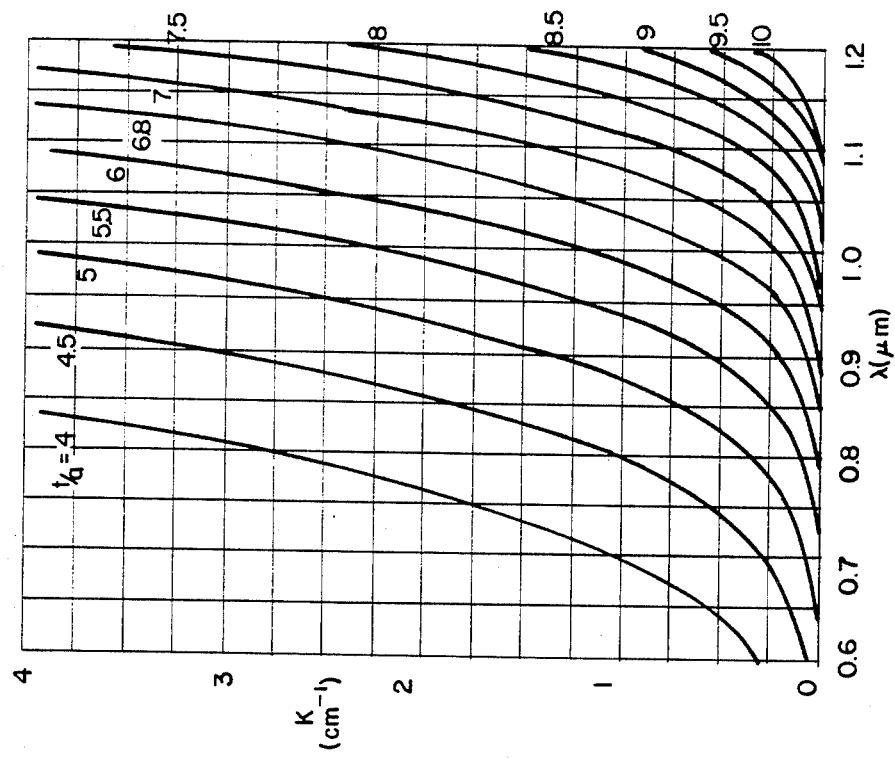
FIG. 4 Coupling coefficient K versus wavelength λ for a fiber with core radius a=2.25 and normalized index difference Δ=0.0024
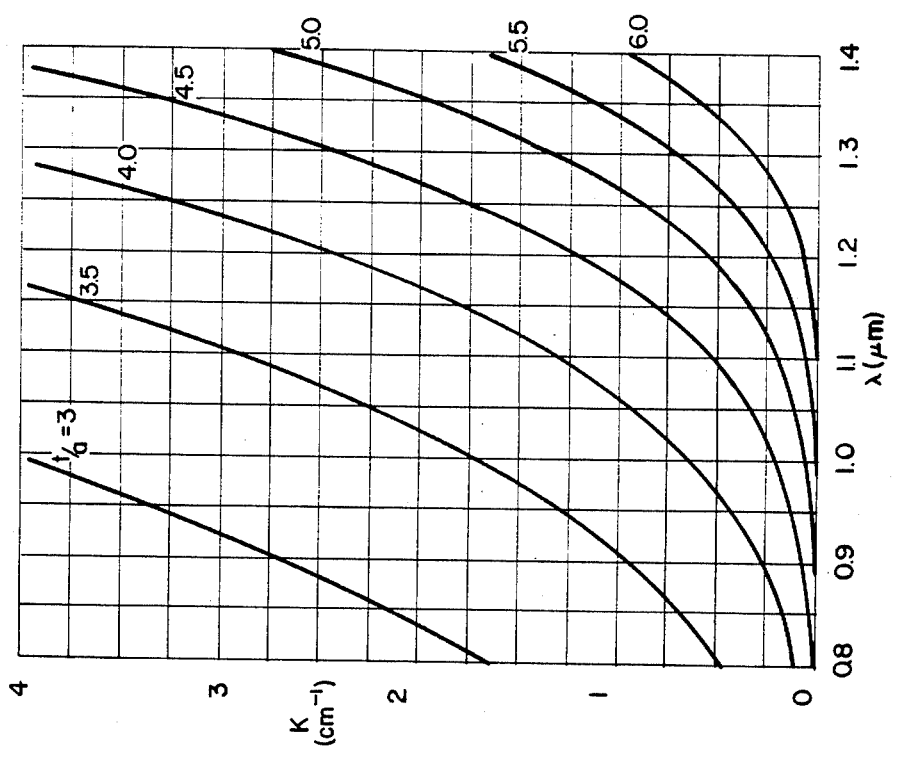
FIG. 3 Coupling coefficient K versus wavelength λ for a fiber with core radius a=4.5 microns and normalized index difference Δ=0.001

METHOD OF WAVELENGTH MULTIPLEXING IN FUSED SINGLE-MODE FIBER COUPLERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The field of the invention generally relates to the optical transmission of information and more particularly refers to the coupling of optical information to and from optical transmission fiber.

In greater particularity, the optical transmission fiber is a continuously extending single-mode fiber functioning as a duplex transmission system and the apparatus and the method of the invention concerns the selective evanescent field coupling to and from the continuous single-mode fiber at one discrete wavelength which does not interfere or interrupt the data transmission at the other discrete wavelength.

The information transfer capabilities of single-mode fiber data links are currently limited, not by the bandwidth of the fiber itself, but rather, by the modulation speed limitations of the wide variety of semiconductor laser sources and the coupling efficiencies of contemporary coupling devices. To more completely utilize the fiber bandwidth capabilities of single-mode fibers, designers have attempted a variety of wavelength multiplexing techniques which it has been hoped will permit the fabrication and realization of multigiga bit optical channels.

Typically, the duplex single-mode link depicted as prior art in FIG. 1 is relied upon. A wavelength $\lambda_1$ from a laser source $S_1$ passes through a coupler into the fiber and is selectively coupled out and detected by a detector $D_1$. Optical information is transmitted in the opposite direction at a wavelength $\lambda_2$ coming from a source $S_2$ and detected at a detector $D_2$. In this type of a transmission system, the two couplers are the critical components in this system in that their characteristics, including coupling loss and cross talk, determine the link's capacity and transmission length capability. Conventional bulk dichroic beamsplitters and coupling optics have been found to be unsuitable for use with diode lasers and single-mode fibers due to the couplers' lack of coupling stability and high throughput losses.

Thus, there is a continuing need in the state-of-the-art for a coupler that assures wavelength selectability in a duplex optical data transmission system and that allows a more complete utilization of the available bandwidth of a single-mode fiber data link without degrading the optical information content.

SUMMARY OF THE INVENTION

The present invention is directed to providing an apparatus and method of entering and extracting a discrete wavelength of optical data in a duplex optical data transmission system. A continuously extending single-mode fiber transmits the two wavelengths and a length of a like single-mode fiber is fused together over a distinct length so that the product of the coupling coefficient and the fused length equals $\pi/2$ to effect a one-hundred percent evanescent field coupling at a first wavelength and equals $\pi$ to effect a zero evanescent field coupling at a second wavelength. This relationship assures a selective wavelength coupling to and from the continuously extending single-mode fiber without interfering with the other wavelength.

The method of assuring such a coupling, relies upon the transmitting of the duplex optical data over a continuous single-mode fiber and the evanescent field coupling so that the product of the coupling coefficient and fused length equals $\pi/2$ for one-hundred percent evanescent field coupling or $\pi$ for zero evanescent field coupling to effect selective coupling of one wavelength with respect to another.

A prime object of the invention is to provide an apparatus and method for coupling optical data in a single-mode fiber system.

Another object is to provide a method and apparatus for coupling optical data that reduces coupling losses and cross talk in a single-mode fiber system.

A further object is to provide an apparatus and method for coupling optical data that increases the link capacity of a single-mode fiber system.

Another object of the invention is to provide an optical data coupling apparatus and method that does not overly compromise the length of the single-mode fiber optical data transmission link.

Still another object is to provide a method and apparatus for increasing the information transmission capability of a single-mode fiber system.

Yet another object of the invention is to provide for the selective entering and extracting of a discrete wavelength of optical data from a single-mode data transmission link.

Yet another object is to provide a method and apparatus for coupling optical data adapted for a bidirectionally transmitting single-mode duplex optical data transmission system.

These and other objects of the invention will become more readily apparent from the ensuing description when taken with the appended drawings.

BRIEF DESCRIPTION OF THE DRAWINGS

FIG. 3 is a graphical representation of one fiber's coupling coefficient versus wavelength response.

FIG. 4 shows another typical optical fiber's coupling coefficient versus wavelength response.

DESCRIPTION OF THE PREFERRED EMBODIMENT

Figure 1:
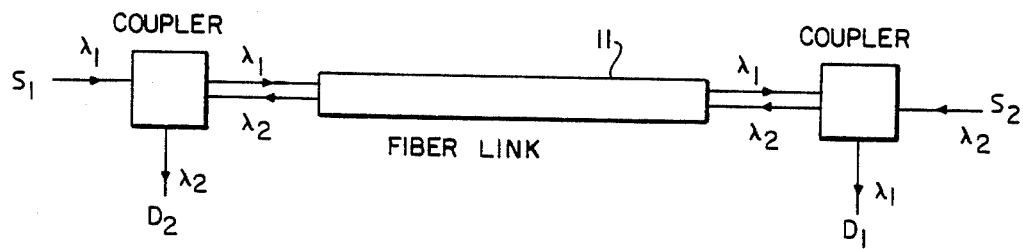
FIG. 1 depicts a prior art duplex optical data transmission system.
Figure 2:
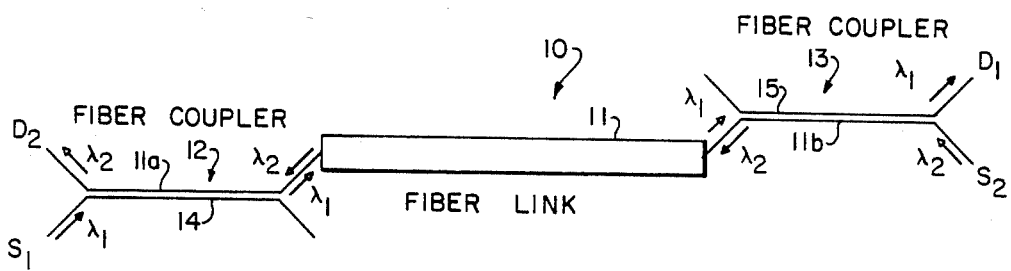
FIG. 2 shows an apparatus of the invention.

Referring to FIG. 2 of the drawings, a duplex optical data transmission system 10 has a single-mode fiber link 11 continuously extending a distance up to several kilometers. An optical source $S_2$ transmits optical data at a wavelength $\lambda_2$ from one end of the continuously extending single-mode fiber to a detector $D_2$ at the opposite end of the link. While the figure shows the optical data at wavelength $\lambda_2$ passing from right to left through the optical data link, the information transfer could as well be from left to right with the source and detector interchanged.

Fiber couplers 12 and 13 are provided at opposite ends of the fiber link and include portions 11a and 11b of the link within each coupler. Lengths 14 and 15 of a single-mode fiber are substantially identical to continuously extending single-mode fiber 11.

Length 14 enables the entry of optical data at a wavelength $\lambda_1$ coming from a source $S_1$ into fiber link 11. Length 15 permits the extraction of optical data at wavelength $\lambda_1$ and its detection at a detector $D_1$. Lengths 14 and 15 permit the entry and extraction of the discrete wavelength $\lambda_1$ of optical data to give the transmission system a duplex optical data transmission capability. The source and detector feed the $\lambda_1$ information the same way or opposite to the $\lambda_2$ data flow.

Fiber couplers 12 and 13 are fabricated in accordance with well known techniques practiced in the art. The claddings from portions 11a and 11b as well as lengths 14 and 15 have been removed preferably by etching. The etched portions and lengths are held together at a closely abutting side-by-side relationship and are fused together. The techniques for etching and fusing are established and the exact manner by which these fabrication steps are performed is not critical at this point. It is necessary however, to maintain a coupling length 1 between fused fibers and to create a distinct coupling coefficient K to assure that the coupling is wavelength selective and rejecting for particular wavelengths corresponding to the omission wavelengths of the sources $S_1$ and $S_2$.

The phenomenon of evanescent field coupling is well established in the art. The hows and whys of a distributed coupling in fiber wavelengths is covered in detail in several texts and publications. One helpful analysis is found on pages 223 et seq. in N. S. Kapany and J. J. Burke, text entitled "Optical Waveguides" (1972).

The relevant theory shows that the fraction of coupled optical power between a pair of etched and fused single-mode fibers is given by $\sin^2(Kl)$ where l is the coupler length and K is the coupling coefficient which depends on the fiber parameters, coupler geometries, and the wavelength.

The fiber core radius dimension as well as its normalized refractive index difference $\Delta$ is predetermined by a manufacturer and the wavelengths transmitted $\lambda_1$ and $\lambda_2$ must come from available sources. The etching conditions as well as ease of handling considerations, usually govern the selection of t and l; t as established in the art is the center-to-center opening between fiber cores. However, in this case, due to the periodic nature of the power transfer and wavelength dependence of K, it is possible to design a coupler with one-hundred percent coupling at one wavelength $\lambda_1$ and zero coupling at wavelength $\lambda_2$. Such a condition requires that the coupler parameters be chosen so that $Kl=\pi/2$ at a wavelength equal to $\lambda_1$ and $Kl=\pi$ at a wavelength equal to $\lambda_2$. When these conditions regarding Kl are satisfied, the optical information from each source $S_1$ and $S_2$ can be totally transferred through the continuously extending single-mode fiber to a corresponding detector with no cross talk.

The coupling coefficient K versus wavelength for two different manufacturers' fibers are shown in FIGS. 3 and 4. The coupling coefficient K versus $\lambda$ curve for different ratios of t/a provide a designer with a great deal of flexibility for wavelength selectivity in a duplex single-mode fiber communication link.

FIG. 4 illustrates the dependance of the coupling coefficient K versus wavelength $\lambda$ for a fiber with a dimension "a" equal to 2.25 microns and a "$\Delta$" equal to 0.0024.

For this particular fiber, given two sources with emission wavelengths $\lambda_1=0.80$ microns and $\lambda_2=0.85$ microns corresponding to gallium arsenide, aluminum-gallium-arsenide sources and a coupling length of "l"-2 cm, it is possible to construct couplers with the desired coupling coefficients $K_1$ and $K_2$ by properly choosing the coupling dimension "t" equal to 11 microns.

It can be seen from the figure as well as derived from theory that the 11 micron value of "t" yields the result $Kl=\pi/2$ at $\lambda_1=0.80$ microns and $Kl=\pi$ at $\lambda_2=0.85$ microns as required.

Obviously, many other modifications and variations of the present invention are possible in the light of the above teachings. It is therefore to be understood that within the scope of the appended claims the invention may be practiced otherwise than as specifically described.

What is claimed is:

1. A method of entering and extracting a discrete wavelength of optical data transmitted in two wavelengths in a duplex optical data transmission system comprising:
    transmitting the duplex optical data over a continuous single-mode fiber only, the step of transmitting includes the uninterrupted passing of the other wavelength throughout the continuous single-mode fiber and
    evanescent field coupling one of two wavelengths of the duplex optical data to and from the system, the evanescent field coupling being effected by there being a one-hundred percent evanescent field coupling at the one wavelength and zero evanescent field coupling at the other wavelength, the step of evanescent field coupling includes the etching away of a precise layer thickness of the claddings of a like single-mode fiber and a portion of the continuous single-mode fiber, the joining of the length l of a like single-mode fiber to the portion of the continuous single-mode fiber to have a discrete center-to-center spacing of the fibers' cores and the fusing of the portion of the continuous single-mode fiber and the length l of the like single-mode fiber together so that the product of the coupling coefficient K and the length l equals $\pi/2$ at the one-hundred percent evanescent field coupled wavelength and equals $\pi$ at the zero evanescent field coupled wavelength.

2. A method according to claim 1 in which the two wavelengths are 0.80 microns and 0.85 microns, the fibers are fabricated such that l=two centimeters and the center-to-center spacing of the fibers' cores is eleven microns.

* * * * *